(12) United States Patent
Wakana

(10) Patent No.: US 10,365,634 B2
(45) Date of Patent: Jul. 30, 2019

(54) MULTIAXIAL CONTROL SYSTEM SETTING AND ADJUSTING FUNCTION SUPPORTING DEVICE

(71) Applicant: Mitsubishi Electric Corporation, Tokyo (JP)

(72) Inventor: Takayuki Wakana, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 225 days.

(21) Appl. No.: 15/023,727

(22) PCT Filed: Oct. 11, 2013

(86) PCT No.: PCT/JP2013/077854
§ 371 (c)(1),
(2) Date: Mar. 22, 2016

(87) PCT Pub. No.: WO2015/052844
PCT Pub. Date: Apr. 16, 2015

(65) Prior Publication Data
US 2016/0231730 A1    Aug. 11, 2016

(51) Int. Cl.
*G05B 19/18* (2006.01)
*G05B 19/409* (2006.01)

(52) U.S. Cl.
CPC .. *G05B 19/409* (2013.01); *G05B 2219/50218* (2013.01)

(58) Field of Classification Search
CPC .............. G05B 19/409; G05B 2219/50218
See application file for complete search history.

(56) References Cited

U.S. PATENT DOCUMENTS 3,916,528 A * 11/1975 Eisenkopf ............ G01B 5/0014
                                                    318/634
5,117,544 A *  6/1992 Kousaku .................. B23B 3/06
                                                     29/27 C
(Continued)

FOREIGN PATENT DOCUMENTS

DE          32 33 468 A1     3/1984
DE         198 83 028 T1     2/2002
(Continued)

OTHER PUBLICATIONS

Japanese Decision of a Patent Grant issued in JP 2014-500197 dated Mar. 11, 2014.
(Continued)

*Primary Examiner* — Brian W Wathen
*Assistant Examiner* — Brian T McMenemy
(74) *Attorney, Agent, or Firm* — Sughrue Mion, PLLC; Richard C. Turner

(57) ABSTRACT

To have a setting and adjusting function of setting and adjusting a control parameter that is set to one servo amplifier for a multiaxial control system that includes a plurality of axes, each of which is a combination of the servo amplifier with one servo motor, and that synchronizes and controls the axes according to a command from a motion controller, to group some of the axes, which constitute mechanical axes in which the axes are mechanically coupled, as one group, to perform adjustment of the control parameter on the axes that constitute the group, and to display an average value of adjustment results of a control parameter of all the axes that constitute the group as a control parameter value of the mechanical axes in each item of the control parameter.

7 Claims, 8 Drawing Sheets

(56) References Cited

U.S. PATENT DOCUMENTS

| | | | | |
|---|---|---|---|---|
| 5,146,410 A * | 9/1992 | Kawamura | ............ | G05B 19/41 318/573 |
| 5,245,257 A * | 9/1993 | Tobise | .................... | B21B 37/52 318/255 |
| 5,252,900 A | 10/1993 | Uehara et al. | | |
| 6,157,156 A * | 12/2000 | Tsuruta | ................... | H02P 23/14 318/568.22 |
| 6,998,812 B2 * | 2/2006 | Kerner | .................... | G01M 1/10 318/432 |
| 8,334,669 B2 | 12/2012 | Nagato | | |
| 2002/0003416 A1 | 1/2002 | Sagasaki et al. | | |
| 2011/0125822 A1 * | 5/2011 | Wasserka | ................ | B29C 45/76 709/201 |
| 2011/0169441 A1 * | 7/2011 | Yoshiura | ............ | G05B 19/4141 318/625 |
| 2014/0163738 A1 | 6/2014 | Suzuki | | |

FOREIGN PATENT DOCUMENTS

| | | | |
|---|---|---|---|
| JP | 03-204008 A | | 9/1991 |
| JP | 10-187210 A | | 7/1998 |
| JP | 2008-033898 A | | 2/2008 |
| JP | 2008033898 A | * | 2/2008 |
| JP | 2009124803 A | * | 6/2009 |
| JP | 2010-049362 A | | 3/2010 |
| JP | 2011-175351 A | | 9/2011 |
| JP | 5295467 B1 | | 9/2013 |
| WO | 2009/057545 A1 | | 5/2009 |

OTHER PUBLICATIONS

International Search Report of PCT/JP2013/077854 dated Nov. 5, 2013.

Communication dated May 10, 2017, issued by the State Intellectual Property Office of the P.R.C. in corresponding Chinese Application No. 201380080116.4.

Communication dated Nov. 9, 2016 from the State Intellectual Property Office of the P.R.C. in counterpart Application No. 201380080116.4.

Communication dated Nov. 29, 2016 from the German Patent and Trademark Office in counterpart Application No. 11 2013 007 444.3.

Communication dated Sep. 29, 2017 from the State Intellectual Property Office of the P.R.C. in counterpart application No. 201380080116.4.

* cited by examiner

FIG.5

| SYSTEM CONFIGURATION SETTING ||||
|---|---|---|---|
| AXIS No. | SERVO AMPLIFIER MODEL NAME | GROUP No. | MECHANICAL AXIS NAME |
| 1 | SERVO AMPLIFIER A | 1 | X-AXIS |
| 2 | SERVO AMPLIFIER B | 1 | X-AXIS |
| 3 | SERVO AMPLIFIER C | - | Y-AXIS |
| 4 | SERVO AMPLIFIER D | - | Z-AXIS |

FIG.6

| TUNING | | | |
|---|---|---|---|
| ADJUSTMENT-TARGET-AXIS DESIGNATION | ✓ | READING | PARAMETER MONITOR |

☐ AXIS 1
☐ AXIS 2
☑ GROUP 1

TUNING MODE SELECTION
◉ AUTO TUNING MODE 1
○ AUTO TUNING MODE 2
○ AUTO TUNING MODE 3
○ AUTO TUNING MODE 4
○ MANUAL MODE

INERTIA-RATIO SETTING
INERTIA RATIO [ ]

RESPONSIVENESS SETTING
RESPONSIVENESS SETTING [ ]

GAIN-PARAMETER SETTING
POSITION CONTROL GAIN [ ] rad/s
SPEED CONTROL GAIN [ ] rad/s ADJUSTMENT RESULT
SETTLING TIME [ ] ms
OVERSHOOT AMOUNT [ ] %

FIG.8

| ITEM | GROUP 1 (X-AXIS) | | - | |
|---|---|---|---|---|
| | AXIS 1 | AXIS 2 | AXIS 3 | AXIS 4 |
| RESPONSIVENESS SETTING | 7 | 7 | 10 | 12 |
| INERTIA RATIO | 20 | 10 | 28 | 29 |
| POSITION CONTROL GAIN | 200 | 100 | 400 | 500 |
| SPEED CONTROL GAIN | 20000 | 1000 | 4000 | 5000 |

FIG.9

TUNING

ADJUSTMENT RESULT

SETTLING TIME 1300 ms
OVERSHOOT AMOUNT 14000 pulse

GAIN PARAMETER SETTING

RESPONSIVENESS SETTING 7
INERTIA RATIO 15
POSITION CONTROL GAIN 150 rad/s
SPEED CONTROL GAIN 1500 rad/s

| ITEM | ADJUSTMENT RESULT | | | |
| --- | --- | --- | --- | --- |
| | GROUP 1 (X-AXIS) | | - | |
| | AXIS 1 | AXIS 2 | AXIS 3 | AXIS 4 |
| SETTLING TIME | 1230 | 1300 | 1200 | 1448 |
| OVERSHOOT AMOUNT | 14000 | 12300 | 11900 | 12200 |

MULTIAXIAL CONTROL SYSTEM SETTING AND ADJUSTING FUNCTION SUPPORTING DEVICE

CROSS REFERENCE TO RELATED APPLICATIONS

This is a National Stage of International Application No. PCT/JP2013/077854 filed Oct. 11, 2013, the contents of which are incorporated herein by reference in its entirety.

FIELD

The present invention relates to a multiaxial control system setting and adjusting function supporting device.

BACKGROUND

A multiaxial control system is conventionally used, that executes a positioning control by synchronizing a plurality of axes according to a control command from a motion controller, where each of the axes is a combination of one servo amplifier with one servo motor. An engineering tool is used for the multiaxial control system as described above, in which the tuning function of a servo gain parameter that is a control parameter, to be set to the servo amplifier, is designed on the assumption of setting and adjusting a servo gain parameter in a single-axis system. Therefore, the operability for setting and adjusting a servo gain parameter in a multiaxial control system using a plurality of axes is not fully considered. In the case of setting and adjusting the servo gain parameter in a multiaxial system, a user cannot simultaneously set or adjust servo gain parameters of a plurality of axes, but needs to set and adjust an individual servo gain parameter of each axis.

That is, on the adjustment screen for the tuning function of servo gain parameters in the conventional engineering tool, a function of adjusting a single servo amplifier is provided, and only adjustment usage for a single axis is considered. Therefore, it is difficult to use the conventional engineering tool for the purpose of adjusting servo gain parameters of a plurality of axes that are mechanically coupled. Accordingly, it is difficult for an unexperienced, unskilled person (user) to adjust servo gain parameters of multiple axes.

For example, in Patent Literature 1, the following method is described. That is, at the time of setting and adjusting a plurality of axes, setting of one item for one axis is first performed on the operation panel included with a device. Next, the set item is copied to the same set items of the remaining axes. The same procedure is repeated on the remaining set items to perform setting of a system made up of a plurality of axes. It is also described in Patent Literature 1 that when the same value of a certain set item is set to all the axes, a specific mark is displayed on the left side of the number assigned to the certain set item.

Further, it is described in Patent Literature 2 that a list of initialized values of a designated group is displayed.

A servo amplifier causes an operation of a servo motor to follow a control command from a controller. In a servo control configured by a position control loop and a speed control loop, the servo amplifier obtains feedback on position information and speed information from the servo motor, and controls a torque that is generated by the servo motor, such that a deviation from the control command from the controller is 0. Therefore, in order to properly execute a servo control, parameter adjustment is needed, in which servo gain set values of position control gain and speed control gain are increased or decreased to adjust the follow-up performance to the control command from the controller.

The servo gain is configured by a plurality of parameters. Therefore, in recent servo amplifiers, in order to facilitate servo adjustment, first the weight (inertia) of a workpiece to be moved is automatically estimated from a load state of each axis. Based on the automatically estimated inertia, the responsiveness setting is increased or decreased to automatically adjust associated servo gain parameters collectively (hereinafter, also "auto tuning"). This auto tuning is performed separately on each axis. However, in a multiaxial system configuration in which a control command is provided from a controller to each axis, when the system includes a plurality of axes that are mechanically coupled (hereinafter, also "gantry axes"), the gantry axes need to receive the same control command and move in the same manner. Accordingly, it is a common procedure to set the same servo gain value to the axes that constitute the gantry axes.

CITATION LIST

Patent Literatures

Patent Literature 1: Japanese Patent Application Laid-open No. 2008-33898
Patent Literature 2: Japanese Patent Application Laid-open No. H10-187210

SUMMARY

Technical Problem

However, for example in the case of gantry axes in which a Y-axis is mechanically coupled at a right angle with an Xa-axis and an Xb-axis provided parallel to each other, when only auto tuning is performed separately on each axis, a load state is varied depending on the stopping position of the Y-axis. Therefore, the servo gain values are not the same as each other in practice. This results in a problem in adjustment of the gantry axes that much time and effort is required to refer to individual set values of constituent axes, and based on the set values, to merge servo gain values, to be set to the constituent axes, into the same value. This problem cannot be solved by the technique to refer to and copy a servo gain of a specific axis as described in Patent Literature 1, or by the list-display technique described in Patent Literature 2.

Further, a monitor of adjustment results shows that when regarded as gantry axes, there are variations in the overshoot amount, and variations in the period of time from when the position command becomes 0 to when the servo motor stops in practice (hereinafter, "settling time") for example, depending on the constituent axis. Therefore, it is difficult to intuitively recognize the behavior of the gantry axes from monitor values of respective axes that constitute the gantry axes. That is, on the adjustment screen, which corresponds to each individual axis, for the tuning function in the conventional engineering tool, a state of other axes except for a target axis cannot be recognized. It is therefore difficult to intuitively recognize the behavior of the gantry axes.

In the case of a multiaxial system made up of a plurality of axes, setting and adjustment of servo gain parameters is performed on each individual axis, and it is necessary to perform the same work on all the other axes. Therefore, setting and adjustment of servo gain parameters in the multiaxial control system requires work time and effort in proportion to the number of axes used.

The present invention has been achieved to solve the above problems, and an object of the present invention is to provide a multiaxial control system setting and adjusting function supporting device that facilitates setting and adjustment of a servo gain parameter for a multiaxial control system that executes a positioning control by synchronizing a plurality of axes, and that is capable of reducing time and effort required for the setting and adjustment.

Solution to Problem

In order to solve the problems and achieve the purposes, according to an aspect of the present invention, there is provided a multiaxial control system setting and adjusting function supporting device, wherein the device is configured to: have a setting and adjusting function of setting and adjusting a control parameter that is set to one servo amplifier for a multiaxial control system that includes a plurality of axes, each of which is a combination of the servo amplifier with one servo motor, and that synchronizes and controls the axes according to a command from a motion controller; group some of the axes, which constitute mechanical axes in which the axes are mechanically coupled, as one group; perform adjustment of the control parameter on the axes that constitute the group; and display an average value of adjustment results of a control parameter of all the axes that constitute the group as a control parameter value of the mechanical axes in each item of the control parameter.

Advantageous Effects of Invention

According to the present invention, it is possible to facilitate setting and adjustment of a servo gain parameter for a multiaxial control system that executes a positioning control by synchronizing a plurality of axes, and to reduce time and effort required for the setting and adjustment.

BRIEF DESCRIPTION OF DRAWINGS

FIG. 5 is a diagram illustrating grouping setting results of axes corresponding to mechanical elements on a system-configuration setting screen of the setting and adjusting function supporting device according to the embodiment of the present invention.

FIG. 6 is a diagram illustrating an example of an adjustment screen for various parameters in the setting and adjusting function supporting device according to the embodiment of the present invention.

FIG. 8 is a diagram illustrating an example of a display screen for results of servo gain parameter adjustment for system constituent axes in the setting and adjusting function supporting device according to the embodiment of the present invention.

FIG. 9 is a diagram illustrating a display example of a tuning screen (an adjustment screen) of mechanical axes grouped in the setting and adjusting function supporting device according to the embodiment of the present invention.

DESCRIPTION OF EMBODIMENTS

Exemplary embodiments of a multiaxial control system setting and adjusting function supporting device according to the present invention will be explained below in detail with reference to the accompanying drawings. The present invention is not limited to the embodiments.

Embodiment

Figure 1:
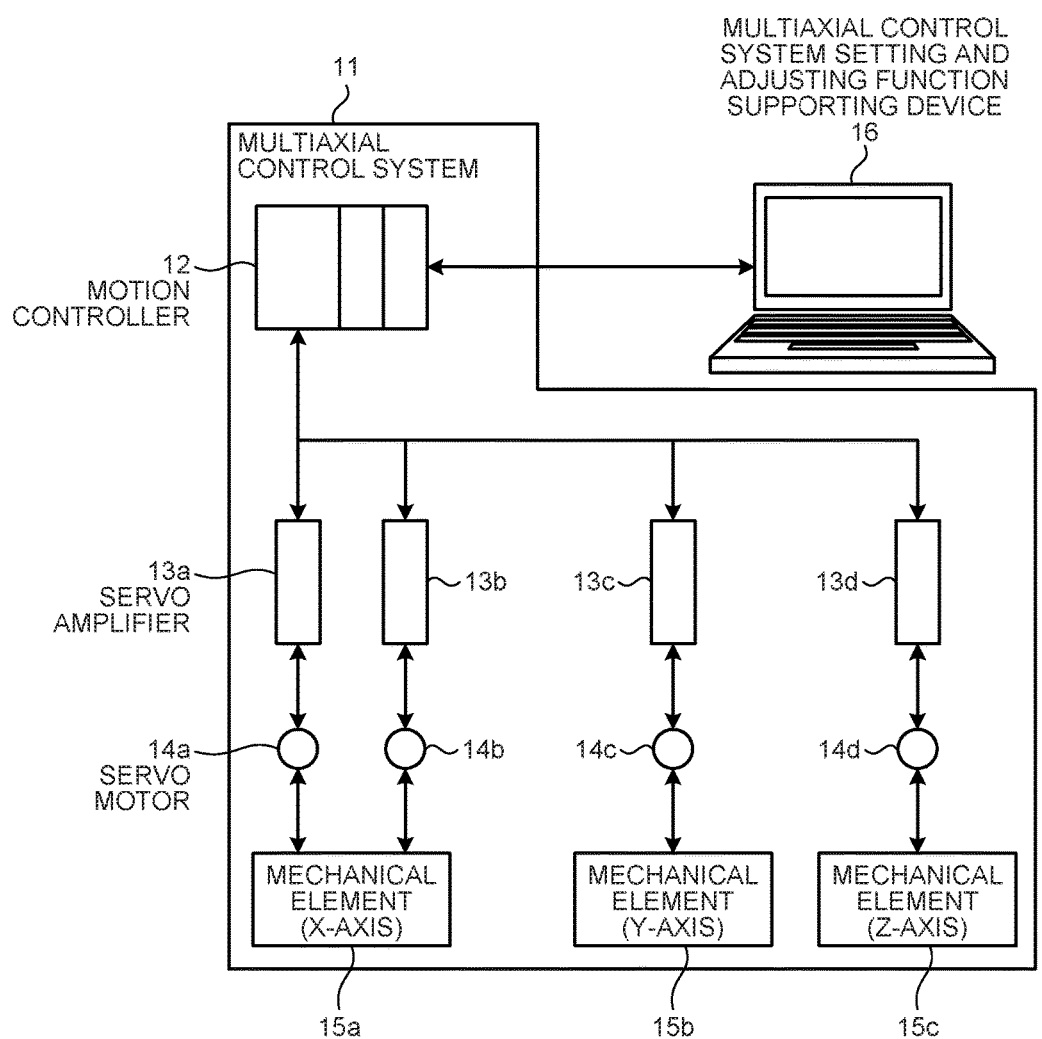
FIG. 1 is a diagram illustrating an example of a system configuration diagram of a multiaxial control system and a multiaxial control system setting and adjusting function supporting device according to an embodiment of the present invention.

FIG. 1 is a diagram illustrating an example of a system configuration diagram of a multiaxial control system 11 and a multiaxial control system setting and adjusting function supporting device (hereinafter, also "setting and adjusting function supporting device") 16 according to an embodiment. This multiaxial control system 11 executes a positioning control by synchronizing a plurality of axes. An example of the multiaxial control system 11 is a filling machine, a packing machine, or a machine tool.

The multiaxial control system 11 includes a motion controller 12, servo amplifiers 13a, 13b, 13c, and 13d, servo motors 14a, 14b, 14c, and 14d, and mechanical elements 15a, 15b, and 15c.

Figure 2:
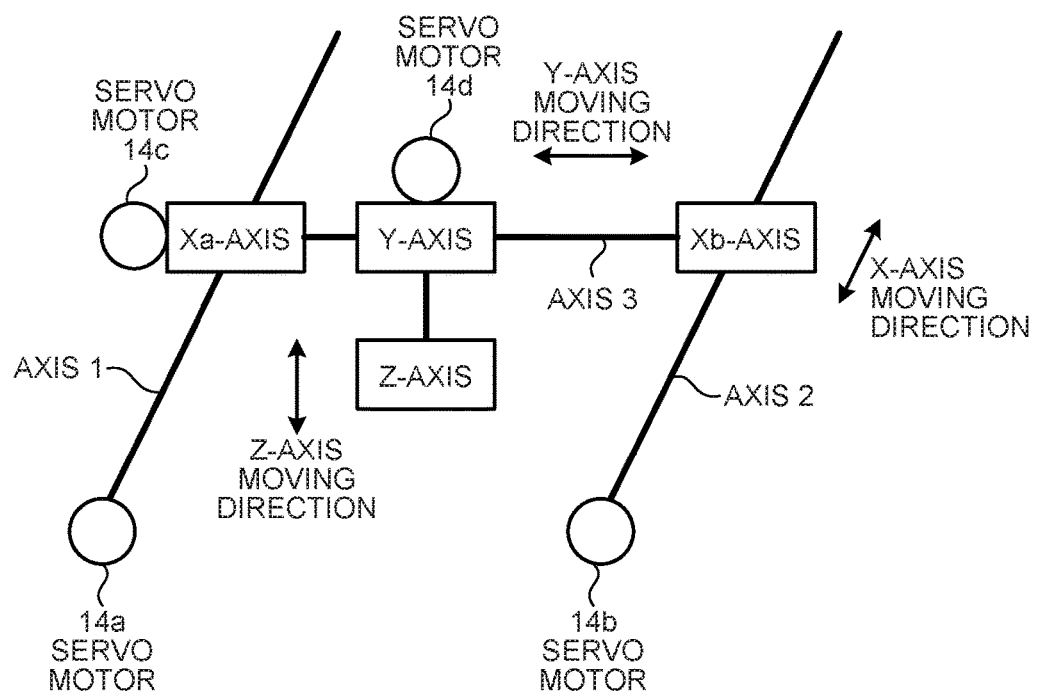
FIG. 2 is a diagram illustrating an example of a mechanical configuration of the multiaxial control system according to the embodiment of the present invention.

FIG. 2 is a diagram illustrating an example of a mechanical configuration of the multiaxial control system 11 according to the present embodiment. As illustrated in FIG. 2, for example, the multiaxial control system 11 according to the present embodiment includes a mechanical element (an X-axis) that is driven by servo motors on two axes, that are the servo motor 14a and the servo motor 14b. An axis on the X-axis, which is driven by the servo motor 14a, is defined as an axis 1 (an Xa-axis). An axis on the X-axis, which is driven by the servo motor 14b, is defined as an axis 2 (an Xb-axis).

The multiaxial control system 11 further includes a mechanical element (a Y-axis) that is driven by the servo motor 14c on one axis, and that is perpendicular to the mechanical element (the X-axis). The multiaxial control system 11 further includes a mechanical element (a Z-axis) that is driven by the servo motor 14d on one axis, and that is perpendicular to the mechanical element (the X-axis) and the mechanical element (the Y-axis). The Y-axis is mechanically connected to the X-axis so as to be perpendicular to the X-axis. The Z-axis is mechanically connected to the Y-axis so as to be perpendicular to the X-axis and the Y-axis. The axis 1 (the Xa-axis) and the axis 2 (the Xb-axis) that are provided parallel to each other are defined as gantry axes.

To the motion controller 12, a general-purpose computer device is connected as the multiaxial control system setting and adjusting function supporting device (an engineering tool) 16. The setting and adjusting function supporting device 16 transmits and writes to the motion controller 12 a set system configuration of a multiaxial control system, and various parameters necessary for controlling the multiaxial control system. The setting and adjusting function supporting device 16 receives various pieces of information from the motion controller 12.

Figure 3:
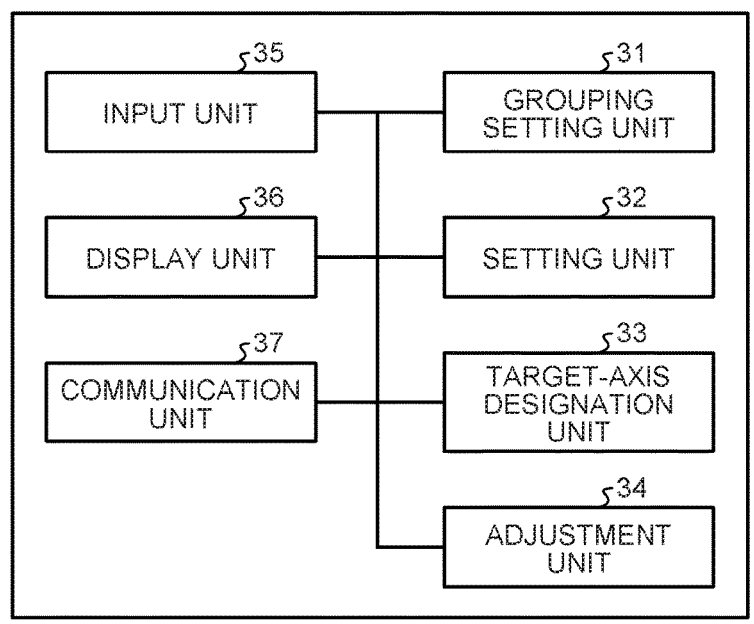
FIG. 3 is a diagram illustrating constituent elements constituting the multiaxial control system according to the embodiment of the present invention.

FIG. 3 is a diagram illustrating constituent elements constituting the multiaxial control system 11 in the present embodiment. The setting and adjusting function supporting device 16 includes a grouping setting unit 31, a setting unit 32, a target-axis designation unit 33, an adjustment unit 34, an input unit 35, a display unit 36, and a communication unit 37. Group selection information that designates a group, and axis selection information that designates grouped axes, are externally input to the grouping setting unit 31. Based on the selection information, the grouping setting unit 31 then performs grouping of a plurality of axes that constitute the mechanical axes that are mechanically coupled.

Based on system-configuration setting instruction information that is externally input, the setting unit 32 sets a servo amplifier model name and a mechanical axis name to grouped axes and ungrouped axes corresponding to the axis No. The setting unit 32 sets various control parameters that are externally input in association with grouped axes and ungrouped axes. Based on adjustment-target-axis designation information that is externally input, the target-axis designation unit 33 designates a group of axes or a single axis as a target axis for adjusting a servo gain parameter that is a control parameter set to a servo amplifier. The adjustment unit 34 performs tuning on a group or an axis designated by the target-axis designation unit 33.

As the input unit 35, various devices are used including a keyboard and a mouse, for example, to input and set various pieces of information to and in the setting and adjusting function supporting device 16. The display unit 36 displays a display screen for each process in the setting and adjusting function supporting device 16, and various necessary information including externally-input information. The communication unit 37 transmits and receives various necessary information to and from an external device through a communication line including the Internet connection line and a dedicated line, for example.

The setting and adjusting function supporting device 16 uses a monitor function to read various monitor information from the motion controller 12 through a communication function. The setting and adjusting function supporting device 16 has a test function of performing a test operation such as a JOG operation, a manual pulser operation, and a return to origin. A setting and adjusting function supporting device uses the aforementioned functions to perform a control parameter setting and adjusting process described below.

Figure 4:
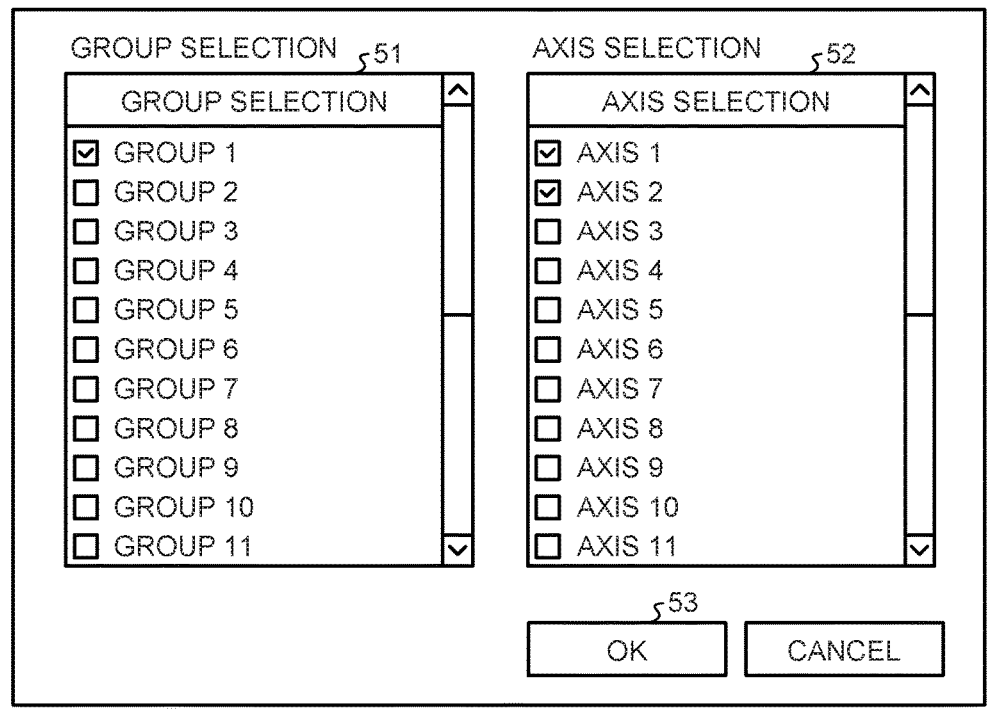
FIG. 4 is a diagram illustrating a grouping setting screen that sets an axis group including a plurality of axes in the setting and adjusting function supporting device according to the embodiment of the present invention.

The setting and adjusting function supporting device 16 according to the present embodiment includes a setting screen so as to associate a plurality of axes included in the multiaxial control system 11 with each other by a grouping setting function. FIG. 4 is a diagram illustrating a grouping setting screen that sets an axis group including a plurality of axes in the setting and adjusting function supporting device 16 according to the present embodiment. The grouping setting screen is displayed on the display unit 36 of the setting and adjusting function supporting device 16, for example.

On the grouping setting screen, a group system configuration, and an axis system configuration are displayed in a list form by an input process through the input unit 35, and a desired axis can be associated with a desired group. That is, on this grouping setting screen, "group No." in a group selection field 51, and "axis No." in an axis selection field 52 are selected. Therefore, by setting a plurality of axes as an arbitrary group, an axis group including the axes can be set. Due to this setting, a plurality of axes that constitute the mechanical axes that are mechanically coupled can be grouped. The "axis No." is the number assigned to an axis included in the multiaxial control system 11.

In the present embodiment, among axes 1 to 4, the axis 1 and the axis 2 are set as a group 1 as axes that constitute the mechanical axes that are mechanically coupled. Therefore, in the example of FIG. 4, the "group 1" is selected in the group selection field 51, and the "axis 1" and the "axis 2" are selected in the axis selection field 52. By selecting an OK button 53, the setting contents are confirmed. With this setting, the "axis 1" and the "axis 2" are set in association with the "group 1".

Because the name of a group can be any name identifiable for a user, the user can arbitrarily change the name to any name (for example, the name is changed to "X-axis").

FIG. 5 is a diagram illustrating grouping setting results of axes corresponding to mechanical elements on a system-configuration setting screen of the setting and adjusting function supporting device 16 according to the present embodiment. On the system-configuration setting screen, an axis system configuration is displayed in a list form, and details on the axis system configuration can be set by an input process through the input unit 35. On the system-configuration setting screen, the "servo amplifier model name" and the "mechanical axis name" are set to each of the grouped axes corresponding to the "axis No." by an input process through the input unit 35. Further, the "servo amplifier model name" and the "mechanical axis name" are set also to each of the ungrouped axes corresponding to the "axis No." by an input process through the input unit 35.

In the example of FIG. 5, the axis No. 1 and the axis No. 2 are grouped by setting the "group No." as "1", and setting the "mechanical axis name" as "X-axis". The axis No. 3 and the axis No. 4 are not grouped. The "mechanical axis name" of the axis No. 3 is set as "Y-axis". The "mechanical axis name" of the axis No. 4 is set as "Z-axis". The "group No." is an attribute of the group (also referred to as "axis group").

FIG. 6 is a diagram illustrating an example of an adjustment screen (a tuning screen) for various parameters in the setting and adjusting function supporting device 16 according to the present embodiment. In FIG. 6, on the tuning screen, an adjustment-target-axis designation field 71, a tuning-mode selection field 72, an inertia-ratio setting field 73, a responsiveness setting field 74, a gain-parameter setting field 75, and an adjustment-result display field 76 are illustrated. On the tuning screen illustrated in FIG. 6, the "group 1" is added to selection contents in the adjustment-target-axis designation field 71 on a one-axis adjustment screen used in a general setting and adjusting function supporting device for only one target axis for which various parameters are adjustable. Therefore, the group 1 having been set previously can be selected.

For example, on this tuning screen, an adjustment target axis is selected in the adjustment-target-axis designation field 71, responsiveness is set in the responsiveness setting field 74, and a tuning mode is selected in the tuning-mode selection field 72, thereby performing auto tuning. Values obtained by the auto tuning are respectively displayed in the inertia-ratio setting field 73, the gain-parameter setting field 75, and the adjustment-result display field 76.

In a general setting and adjusting function supporting device, it is possible to adjust various parameters of only one target axis on the adjustment screen. In contrast, on the adjustment screen for various parameters in the setting and adjusting function supporting device 16 according to the present embodiment, the previously-set group 1 can be selected as an adjustment target axis. Due to this selection, various parameters of the group 1 including mechanical axes mechanically coupled, that are the axis No. 1 and the axis No. 2, can be adjusted with the same operability as a general setting and adjusting function supporting device.

In the setting and adjusting function supporting device 16 according to the present embodiment, only one axis can still be selected as in an adjustment target axis similarly to a general setting and adjusting function supporting device. In a case where a plurality of axes are grouped together, an individual set value of each axis is slightly adjusted intentionally for improved performance in some cases. In the setting and adjusting function supporting device 16 according to the present embodiment, an adjustment target axis is selected in the adjustment-target-axis designation field 71, and therefore the adjustment target axis can be easily switched to either mechanical axes or each axis.

Figure 7:
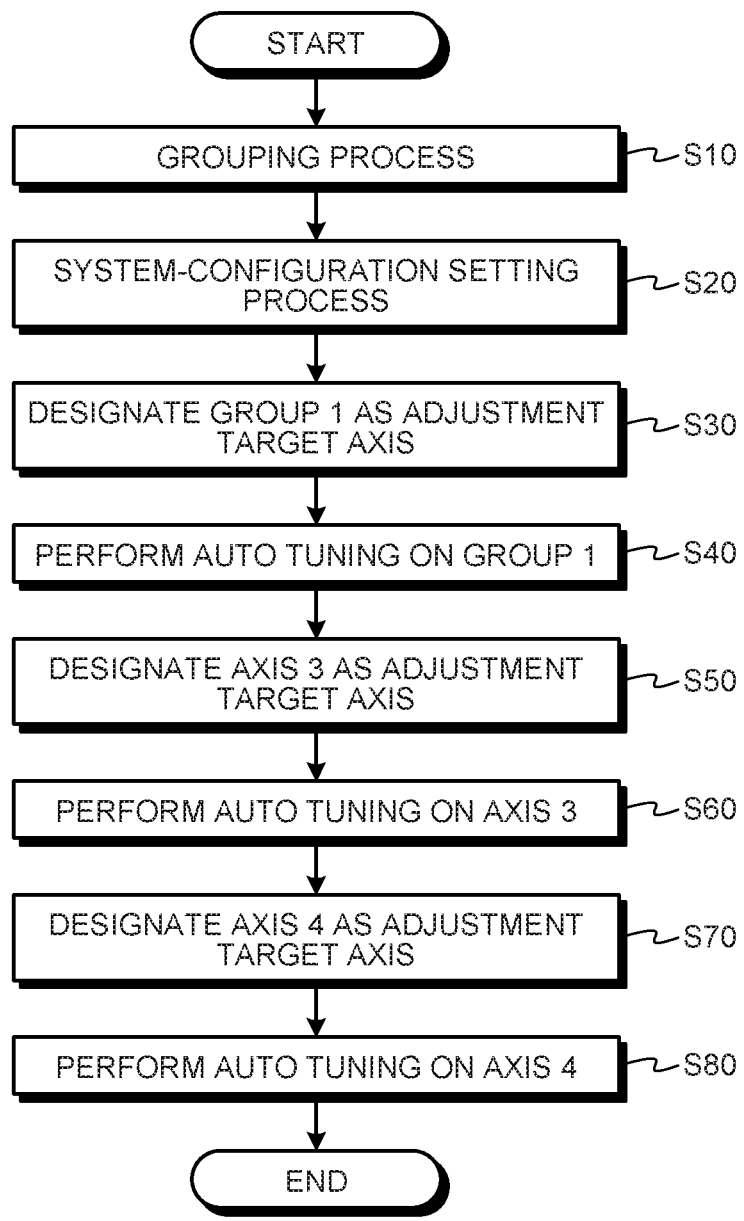
FIG. 7 is a flowchart illustrating a process for setting a servo gain parameter of an axis group in the setting and adjusting function supporting device according to the embodiment of the present invention.

FIG. 7 is a flowchart illustrating a process for setting a servo gain parameter in the setting and adjusting function supporting device 16 according to the present embodiment. Details on each step are described below. The following descriptions focus on setting of a servo gain parameter of the group 1 in which mechanical axes that are mechanically coupled (gantry axes) are grouped.

First, a user inputs grouping instruction information by using the input unit 35. Therefore, in the setting and adjusting function supporting device 16, the grouping setting screen illustrated in FIG. 4 is displayed, for example, to perform a grouping process for associating a plurality of axes with each other by the grouping setting function, where the axes are included in the multiaxial control system 11, and constitute the mechanical axes that are mechanically coupled (Step S10). In this example, the axis 1 (the Xa-axis) and the axis 2 (the Xb-axis) that are provided parallel to each other are defined as mechanical axes that are mechanically coupled (gantry axes). Therefore, the axis 1 and the axis 2 are grouped as the group 1. The axis 1 and the axis 2 are grouped as the group 1 on the grouping setting screen illustrated in FIG. 4 by inputting selection information by the user using the input unit 35.

That is, by selecting the "group 1" in the group selection field 51 on the grouping setting screen, "group 1" selection information is input to the grouping setting unit 31. Further, by selecting the "axis 1" and the "axis 2" in the axis selection field 52, "axis 1" selection information and "axis 2" selection information are input to the grouping setting unit 31. By selecting the OK button 53, confirmed instruction information is input to the grouping setting unit 31 to confirm the designation by the "group 1" selection information, the "axis 1" selection information, and the "axis 2" selection information. Therefore, setting of the axis 1 and the axis 2 as the group 1 is confirmed. With this setting, the "axis 1" and the "axis 2" are associated with the "group 1".

Next, the user inputs system-configuration setting instruction information by using the input unit 35. Therefore, in the setting and adjusting function supporting device 16, the system-configuration setting screen illustrated in FIG. 5 is displayed to perform an axis system-configuration setting process (Step S20). On the system-configuration setting screen, the "servo amplifier model name" and the "mechanical axis name" are respectively set to the axis 1 and the axis 2 that are grouped as the group 1, corresponding to the "axis No.". Further, the "servo amplifier model name" and the "mechanical axis name" are respectively set to each of the ungrouped axes corresponding to the "axis No.". The user inputs these pieces of system configuration information by using the input unit 35, and therefore the system configuration information is input to the setting unit 32.

Various set values and characteristic values, which are necessary to execute a positioning control on respective axes included in the multiaxial control system 11, are input by an input process through the input unit 35, and are set by the setting unit 32.

Next, the user inputs servo gain parameter adjustment instruction information by using the input unit 35. Therefore, in the setting and adjusting function supporting device 16, the tuning screen illustrated in FIG. 6 is displayed, for example, to perform a servo gain parameter adjustment process. Servo gain parameter adjustment for mechanical axes (gantry axes) begins with estimation of the inertia ratio, similarly to a general setting and adjusting function supporting device, in which only one axis is targeted for servo gain parameter adjustment.

First, in the adjustment-target-axis designation field 71 on the tuning screen illustrated in FIG. 6, a user inputs adjustment-target-axis designation information of the group 1 by using the input unit 35. Therefore, the information is input to the target-axis designation unit 33, and the group 1 is designated as a target axis of the servo gain parameter adjustment (Step S30).

The user then inputs auto-tuning instruction information, for example, by using the input unit 35. Therefore, in the setting and adjusting function supporting device 16, the adjustment unit 34 performs auto tuning (Step S40). In the target-axis designation unit 33, the group 1 is designated as a target axis of the servo gain parameter adjustment. Accordingly, the adjustment unit 34 performs auto tuning on the group 1 as a target. That is, the adjustment unit 34 uses an auto-tuning function to move the X-axis according to a command from the motion controller 12, thereby estimating an individual inertia ratio of the axis 1 (the Xa-axis) and the axis 2 (the Xb-axis). When the axis 1 (the Xa-axis) and the axis 2 (the Xb-axis) that constitute the group 1 show results of the auto tuning as illustrated in FIG. 8, for example, the adjustment unit 34 calculates an average value of the inertia ratio of the axis 1 (the Xa-axis) and the axis 2 (the Xb-axis), and displays the average value as an inertia ratio of the group 1 as illustrated in FIG. 9. FIG. 8 is a diagram illustrating an example of a display screen for results of servo gain parameter adjustment for system constituent axes. FIG. 9 is a diagram illustrating a display example of a tuning screen (an adjustment screen) of mechanical axes grouped as the group 1.

As described above, the adjustment unit 34 calculates an average value of the inertia ratio of a plurality of axes (the axis 1 (the Xa-axis) and the axis 2 (the Xb-axis)), and displays the average value as an inertia ratio of the group 1. Therefore, even in a state where the inertia ratio is unbalanced between the axis 1 (the Xa-axis) and the axis 2 (the Xb-axis) attributable to the stopping position of the Y-axis, the adjustment unit 34 can display a value that is less likely to be affected by this unbalanced state. In this manner, an estimated value of a unified inertia ratio, which is not affected by the stopping position of the Y-axis, can be displayed as an estimated value of an inertia ratio of the group 1. Therefore, a user can perform setting and adjustment on the group 1 in the same manner as on one axis without recognizing that the group 1 includes a plurality of axes.

As an inertia ratio of the group 1, an average value of the inertia ratio of the axis 1 (the Xa-axis) and the axis 2 (the Xb-axis) is calculated and displayed. In a case where a greater number of axes are grouped as mechanical axes, an average value of the inertia ratio of all the axes is calculated and displayed.

When estimation of the inertia ratio is completed, the user inputs auto-tuning-mode instruction information indicating that the inertia ratio is not estimated, for example, by using the input unit 35. Therefore, the adjustment unit 34 changes the process mode to an auto-tuning mode in which the inertia ratio is not estimated, and writes the inertia ratio on the tuning screen illustrated in FIG. 9. At this time, an average value of the inertia ratio of the axis 1 (the Xa-axis) and the axis 2 (the Xb-axis) is written on the tuning screen.

Accordingly, the same inertia ratio of the axis 1 (the Xa-axis) and the axis 2 (the Xb-axis) is written on the tuning screen, and is fixed.

In the auto-tuning mode in which the inertia ratio is not estimated, the adjustment unit 34 performs auto tuning based on the inertia ratio written on the tuning screen, and based on a predetermined responsiveness set value, illustrated in FIG. 9. That is, based on the automatically-estimated inertia ratio of mechanical axes in the group 1, the adjustment unit 34 automatically adjusts a position control gain and a speed control gain as servo gain parameters associated with the predetermined responsiveness set value. As illustrated in FIG. 9, the adjustment unit 34 then displays the adjusted position control gain and speed control gain collectively on the tuning screen (the adjustment screen) of mechanical axes grouped as the group 1. As illustrated in FIG. 8, the adjustment unit 34 displays a list of the inertia ratio, the position control gain, and the speed control gain of each axis collectively, along with responsiveness setting, as results of servo gain parameter adjustment for the axis 1 (the Xa-axis) and the axis 2 (the Xb-axis) resulting from the auto tuning.

The position control gain and the speed control gain that are servo gains are decided by the inertia ratio and the responsiveness setting. Therefore, by writing the same responsiveness set value to the axis 1 (the Xa-axis) and the axis 2 (the Xb-axis), the same position control gain and the same speed control gain are acquired as servo gains to the axis 1 (the Xa-axis) and the axis 2 (the Xb-axis). Accordingly, as illustrated in FIG. 9, on the tuning screen (the adjustment screen) of mechanical axes grouped as the group 1, a single value is displayed as a position control gain, and a single value is displayed as a speed control gain, which are servo gains.

FIG. 8 represents different values of estimated inertia ratio of the axis 1 (the Xa-axis) and the axis 2 (the Xb-axis). Therefore, although the same responsiveness set value is written to the axis 1 (the Xa-axis) and the axis 2 (the Xb-axis), different values of position control gain are displayed to the axis 1 (the Xa-axis) and the axis 2 (the Xb-axis), and different values of speed control gain are displayed to the axis 1 (the Xa-axis) and the axis 2 (the Xb-axis).

Figures 10, 11:
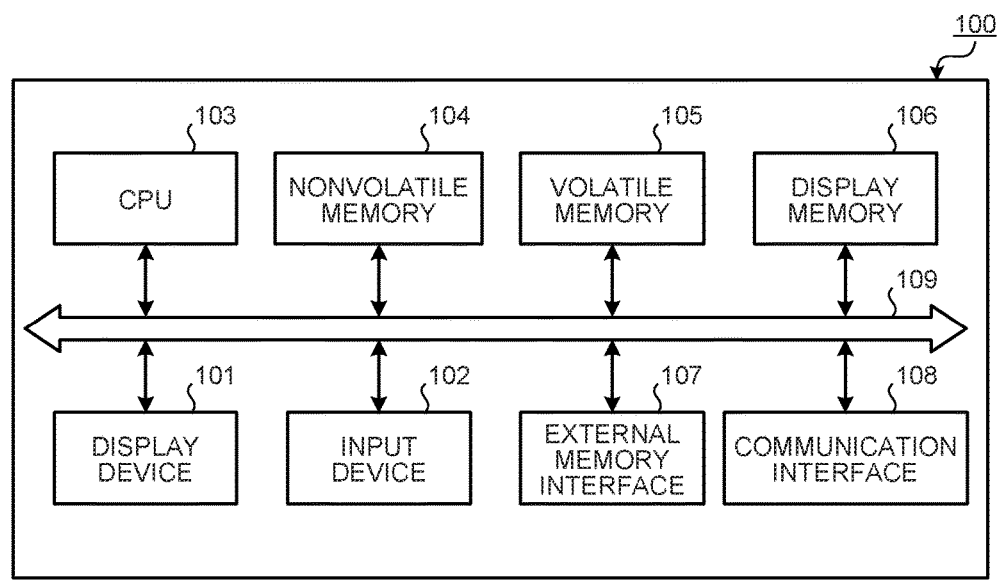
FIG. 10 is a diagram illustrating an example of a display screen for results of servo adjustment for system constituent axes by auto tuning in the setting and adjusting function supporting device according to the embodiment of the present invention.
FIG. 11 is a block diagram schematically illustrating a configuration example of a computer device that realizes a function as the setting and adjusting function supporting device according to the embodiment of the present invention.

As illustrated in FIG. 9, as results of the auto tuning (servo adjustment), the settling time and the overshoot amount are displayed on the tuning screen (the adjustment screen). At this time, the values of settling time, displayed separately on a monitor as an adjustment result, differs between the axis 1 (the Xa-axis) and the axis 2 (the Xb-axis) as illustrated in FIG. 10. In this case, as illustrated in FIG. 9, the most unfavorable value (an undesirable value), either the settling time of the axis 1 or the settling time of the axis 2, is displayed as a settling time of the group 1 on the tuning screen (the adjustment screen). This is effective in easily recognizing a state where all the axes (the axis 1 and the axis 2) that drive the X-axis are stopping. A less-unbalanced adjustment result among a plurality of axes is easily obtained. FIG. 10 is a diagram illustrating an example of a display screen for results of servo adjustment for system constituent axes by auto tuning. As illustrated in FIG. 10, the adjustment unit 34 displays a list of adjustment results of each axis.

The overshoot amount indicates an amount of overshooting a command position during an actual operation. The values of this overshoot amount, displayed separately on a monitor as an adjustment result, differ between the axis 1 (the Xa-axis) and the axis 2 (the Xb-axis) as illustrated in FIG. 10. In this case, as illustrated in FIG. 9, the most unfavorable value (an undesirable value), either the overshoot amount of the axis 1 or the overshoot amount of the axis 2, is displayed as a value of the overshoot amount of the group 1 on the tuning screen (the adjustment screen). With this display, the most unfavorable state of the overshoot amount can be recognized. This is effective to easily perform adjustment so as to suppress the overshoot amount on all the axes (the axis 1 and the axis 2) that drive the X-axis. A less-unbalanced adjustment result among a plurality of axes is easily obtained.

Based on the settling time and the overshoot amount that are adjustment results, the value of the responsiveness setting is increased to perform auto tuning. This improves the follow-up performance to a control command. By reducing the settling time, the takt time is reduced, and therefore the servo control performance can be improved. The adjustment is then completed to an extent that can meet required specifications.

At the time of changing the value of the responsiveness setting, a process for changing the value of the responsiveness setting to the same value is performed collectively on the axis 1 and the axis 2 that constitute the mechanical axes. That is, on the tuning screen (the adjustment screen) as illustrated in FIG. 6 or FIG. 9 for example, a changed value of the responsiveness setting is input through the input unit 35, and then the setting unit 32 changes the responsiveness setting of the axis 1 and the axis 2 collectively to the same input value. For example, when the responsiveness setting is changed on the tuning screen (the adjustment screen) illustrated in FIG. 6 or FIG. 9, the responsiveness setting of the axis 1 and the axis 2 on the display screen for results of servo gain parameter adjustment illustrated in FIG. 8 is collectively changed to the same value.

The setting unit 32 performs a process for changing other various set values, necessary to execute a positioning control, to the same value collectively on the axis 1 and the axis 2 that constitutes the mechanical axes. Changing a servo gain parameter of axes that constitute the group 1 to the same value collectively in the manner as described above can improve work efficiency, and can prevent the user from forgetting the writing.

When the group 1 is designated as an adjustment target, the adjustment unit 34 compares servo gain parameters with each other, which are obtained from the axis 1 and the axis 2 that are constituent axes of the group 1, and highlights a servo gain parameter that differs between the axis 1 and the axis 2. For example, the adjustment unit 34 displays the servo gain parameter in highlighted color or highlights it with bold text. This makes it possible to easily confirm which of servo gain parameters differs between the axis 1 and the axis 2, and how much the difference is.

After the adjustment of the group 1 is completed, in the adjustment-target-axis designation field 71 on the tuning screen illustrated in FIG. 6, the user inputs adjustment-target-axis designation information of the axis 3 by using the input unit 35. Therefore, this information is input to the target-axis designation unit 33, and the axis 3 is designated as a target axis of the servo gain parameter adjustment (Step S50). Similarly to the case where the group 1 is designated as a target axis of the servo gain parameter adjustment, the adjustment unit 34 performs auto tuning, and completes the adjustment to an extent that can meet required specifications (Step S60).

In this case, because of adjustment of one axis, there is a single estimated value of the inertia ratio, and therefore the obtained estimated value is used. Further, because of adjustment of one axis, only a single value of the settling time is obtained, and only a single value of the overshoot amount is obtained, as results of the auto tuning (servo adjustment), and therefore these obtained estimated values are respectively used.

After the adjustment of the axis 3 is completed, auto tuning is also performed on the axis 4 in the same manner as on the axis 3, and the adjustment is completed to an extent that can meet required specifications (Steps S70 and S80). Tuning results of the axis 3 and the axis 4 are also displayed on the screen as illustrated in FIGS. 8, 9, and 10. With this display, on the screen illustrated in FIGS. 8 and 10, a list of servo gain parameters of a plurality of axes is displayed collectively. Actual set values of axes that constitute the mechanical axes are compared with each other, and adjusted servo gain parameters of the axes are compared with each other, thereby easily recognizing the difference. That is, as illustrated in FIG. 8, auto-tuning results of the axis 1 and the axis 2 are displayed in a list, and are compared with each other, thereby easily recognizing a difference in the servo gain parameter between constituent axes of the gantry axes.

There has been described above the case where auto tuning is performed. However, it is also possible to perform manual tuning instead of the auto tuning.

Normally, based on the settling time and the overshoot amount that are adjustment results, responsiveness is increased, and then the adjustment is completed to an extent that can meet required specifications. However, when required specifications cannot be met by solely adjusting the responsiveness setting, the auto tuning is stopped, and then manual adjustment is performed in some cases. In the manual adjustment, a control parameter is individually set to each axis that constitutes the group by a user input to adjust or change an individual servo gain parameter. When the group 1 is designated as an adjustment target, a servo gain parameter having been changed by manual adjustment is reflected on the axis 1 and the axis 2 simultaneously. Therefore, there is no difference in the servo gain parameter between the axis 1 and the axis 2.

As a method in a case where required specifications cannot be met even by manual adjustment, it is possible to change the adjustment target axis to either the axis 1 or the axis 2 in order to intentionally adjust the balance between the axes. For example, in an operation pattern in which a multiaxial control system often operates in a state where the Y-axis is close to the axis 1, and in which the mechanical friction differs between the axis 1 and the axis 2, it is also possible to easily switch between adjustment target axes through manual adjustment by a skilled person (user). This makes it possible to perform various adjustment on the same screen.

When the balance between the axes has been changed intentionally by manual adjustment, the group 1 is designated as an adjustment target axis to display a list of servo gain parameters as illustrated in FIG. 8. Therefore, different servo gain parameters, obtained from the axis 1 and the axis 2 that are constituent axes of the group 1, are displayed in highlighted color. This makes it possible to easily confirm which of servo gain parameters differs, and how much the difference is.

As illustrated in FIG. 8, auto-tuning results of the axis 1 (the Xa-axis) and the axis 2 (the Xb-axis) are displayed in a list, and are compared with each other, thereby easily recognizing a difference in the servo gain parameter between respective constituent axes of the gantry axes.

FIG. 11 is a block diagram schematically illustrating a configuration example of a computer device 100 that realizes a function as the setting and adjusting function supporting device 16 according to the present embodiment. As illustrated in FIG. 11, the computer device 100 has a configuration, in which a display device 101 such as an LCD (Liquid Crystal Display), an input device 102 such as a keyboard, a CPU 103 that performs calculation, a nonvolatile memory 104 such as a ROM (Read Only Memory), a volatile memory 105 such as a RAM (Random Access Memory), a display memory 106 that stores therein a display screen to be displayed on the display device 101, an external memory interface 107 that is an interface with a removable external memory such as a flash memory, a communication interface 108 that communicates with an external device, and the like are connected through a bus 109.

A program, stored in the nonvolatile memory 104, and describing a process procedure of the function as the above setting and adjusting function supporting device 16, is loaded to the volatile memory 105, and is executed by the CPU 103. This program is recorded in a computer-readable recording medium such as a hard disk, a CD (Compact Disk)-ROM (Read Only Memory), an MO (Magneto-Optical Disk), or a DVD (Digital Versatile Disk or Digital Video Disk). This program can be also distributed through a network (a communication line) such as the Internet. In this case, the program is stored on the nonvolatile memory 104 from an information-processing terminal connected through the communication interface 108.

While in the above descriptions, the setting and adjusting function supporting device 16 is configured by a computer, a dedicated device that serves as a setting and adjusting function supporting device can be also used.

As described above, in the present embodiment, mechanical axes that are mechanically coupled are added to the adjustment target axis. Therefore, servo gain parameters can be adjusted with better operability by grouping mechanical axes, in which a plurality of axes are mechanically coupled, and by regarding the group as one axis, without changing the layout of a general adjustment screen that displays a servo gain value of one axis.

In the present embodiment, in adjustment of servo gain parameters targeted for mechanical axes in which a plurality of axes are mechanically coupled, an average value of the servo gain parameter of the axes is displayed. With this display, a unified servo gain parameter value, which is not affected by other axes, can be displayed as a servo gain parameter value of the group 1. Therefore, even in a state where adjustment results are unbalanced between the axes, a display value is less likely to be affected by the unbalanced state. Accordingly, a user can work without recognizing that there are a plurality of mechanical axes.

In the present embodiment, a list of adjustment results of servo gain parameters is displayed. By displaying the most unfavorable value among those of a plurality of axes that constitute the group (mechanical axes), the most unfavorable value of the servo gain parameter can be recognized. A less-unbalanced adjustment result among the axes is easily obtained.

In the present embodiment, a list of servo gain parameters of axes that constitute the mechanical axes is displayed. Highlighting the section, where the set values or the adjustment results are not same as each other, makes it possible to easily confirm which of servo gain parameters differs, and how much the difference is. Further, a user can easily notice if the user forgets collective writing of the set values.

In the present embodiment, in a process of changing a servo gain parameter when a group (mechanical axes) is selected as an adjustment target axis, the servo gain parameter of axes that constitute the group (mechanical axes) is changed recognizing to the same value through a single process. This can improve work efficiency, and can prevent the user from forgetting the writing.

In the present embodiment, in a setting list when a group (mechanical axes) is selected as an adjustment target axis, actual set values of a plurality of axes that constitute the group (mechanical axes) are displayed on an axis-by-axis basis. When the set values differ depending on the axis, the different set values are highlighted. This makes it easier to quantitatively recognize the changed section and the degree of the difference when parameters of axes that constitute the mechanical axes are intentionally made different from each other.

Therefore, according to the present embodiment, servo gain parameters can be easily set and adjusted for a multiaxial control system that executes a positioning control by synchronizing a plurality of axes. Time and effort required for the setting and adjustment is reduced, and accordingly a user's work load can be reduced.

INDUSTRIAL APPLICABILITY

As described above, the multiaxial control system setting and adjusting function supporting device according to the present invention is useful for reducing time and effort required for setting and adjustment of a servo gain parameter for a multiaxial control system that executes a positioning control by synchronizing a plurality of axes.

REFERENCE SIGNS LIST

11 multiaxial control system, 12 motion controller, 13a, 13b, 13c, 13d servo amplifier, 14a, 14b, 14c, 14d servo motor, 15a, 15b, 15c mechanical element, multiaxial control system setting and adjusting function supporting device (setting and adjusting function supporting device), 31 grouping setting unit, 32 setting unit, 33 target-axis designation unit, 34 adjustment unit, input unit, 36 display unit, 37 communication unit, group selection field, 52 axis selection field, 71 adjustment-target-axis designation field, 72 tuning-mode selection field, 73 inertia-ratio setting field, 74 responsiveness setting field, 75 gain-parameter setting field, 76 adjustment-result display field, 100 computer device, 101 display device, 102 input device, 103 CPU, 104 nonvolatile memory, 105 volatile memory, 106 display memory, 107 external memory interface, 108 communication interface, 109 bus.

The invention claimed is:

1. A multiaxial control system setting and adjusting function supporting device, wherein the multiaxial control system setting and adjusting function supporting device is configured to:
   set and adjust a control parameter that is set to a servo amplifier of the multiaxial control system that includes a plurality of axes, each of the plurality of axes is driven by a combination of the servo amplifier with a servo motor, and that synchronizes and controls the plurality of axes according to a command from a motion controller,
   group, as one group, first axes of the plurality of axes based on an input control command, the first axes comprising mechanical axes which are mechanically coupled,
   perform an adjustment of the control parameter on the first axes as the group, the performing the adjustment comprising obtaining adjustment results via tuning of a servo gain parameter, as the control parameter, based on a responsiveness value which is set as a single value for the first axes as the group, and
   control a display to display an average value of the adjustment results of the servo gain parameter for the first axes as a control parameter value of the mechanical axes, the adjustment results being associated with the responsiveness value,
   wherein inertia ratios are estimated individually for the first axes as the group, an average value of the inertia ratios is calculated, and the average value of the inertia ratios are displayed along with the adjustment results.

2. The multiaxial control system setting and adjusting function supporting device according to claim 1, wherein the adjustment results further comprise at least one of a settling time or an overshoot, of each of the first axes, and
   the multiaxial control system setting and adjusting function supporting device is further configured to control the display to display a most unfavorable value among the at least one of the settling time or the overshoot that was obtained for one of the first axes as an adjustment result of the at least one of the settling time or the overshoot of the mechanical axes.

3. The multiaxial control system setting and adjusting function supporting device according to claim 1, wherein the multiaxial control system setting and adjusting function supporting device is further configured to control the display to display a control parameter item, in which the adjustment of the control parameter is not the same among the first axes, to be highlighted.

4. The multiaxial control system setting and adjusting function supporting device according to claim 1, wherein a set value for the adjustment of the control parameter is changed to a same value collectively for the first axes by a single input process from outside.

5. The multiaxial control system setting and adjusting function supporting device according to claim 1, wherein, in a manual adjustment in which the control parameter is individually set for each of the first axes and the adjustment of the control parameter is performed, the multiaxial control system setting and adjusting function supporting device is further configured to control the display to display a control parameter item, in which a set value of the control parameter is not the same among the first axes, to be highlighted.

6. The multiaxial control system setting and adjusting function supporting device according to claim 1, wherein the multiaxial control system setting and adjusting function supporting device is further configured to, based on selecting a single axis as a target axis, among the plurality of axes, for setting and adjusting the control parameter, perform the adjustment of the control parameter on the selected axis, and control the display to display an adjustment result of the control parameter.

7. The multiaxial control system setting and adjusting function supporting device according to claim 1, wherein a settling time corresponding to a period of time from when a position command to the servo motor becomes 0 to when the servo motor stops and an overshoot amount indicating an amount of overshooting the position command during an actual operation are displayed along with the adjustment results.

* * * * *